United States Patent [19]
DeWitte et al.

[11] 3,818,274
[45] June 18, 1974

[54] REMOTE SENSING VOLTAGE CLAMPING CIRCUIT
[75] Inventors: Maurice J. DeWitte, Elmhurst; Gerald L. Wojciechowski, Chicago, both of Ill.
[73] Assignee: GTE Automatic Electric Laboratories Incorporated, Northlake, Ill.
[22] Filed: Mar. 29, 1973
[21] Appl. No.: 345,925

[52] U.S. Cl. ................ 317/31, 317/33 VR, 323/1, 307/202
[51] Int. Cl. ......................... H02h 9/04, G05f 1/00
[58] Field of Search ............ 323/22 V, 22 T, 22 SC, 323/24, 1; 317/31, 33 VR; 307/202

[56] References Cited
UNITED STATES PATENTS
3,098,192  7/1963  Levy, Jr. et al. ................ 323/22 T
3,697,862  10/1972  Taylor ........................... 323/22 T X
3,743,917  7/1973  Zettl et al. ....................... 323/24 X OTHER PUBLICATIONS
Kepco Power Supply Handbook – 2nd Printing 1966, (TK451.K4 B5 C.7), Pgs. 72–76 relied upon.

Primary Examiner—Gerald Goldberg
Attorney, Agent, or Firm—J. V. Lapacek

[57] ABSTRACT

Apparatus for sensing the actual voltage at a load circuit remotely located from its power source and clamping the power source output level to prevent overvoltage levels at the remote load, including a high impedance sensing lead and a detector-clamping circuit coupled intermediate the sensing lead and the power source. The detector responds to attempts of the voltage level at the remote load to exceed the overvoltage level so as to actuate a drive signal and clamp the power source output.

8 Claims, 2 Drawing Figures

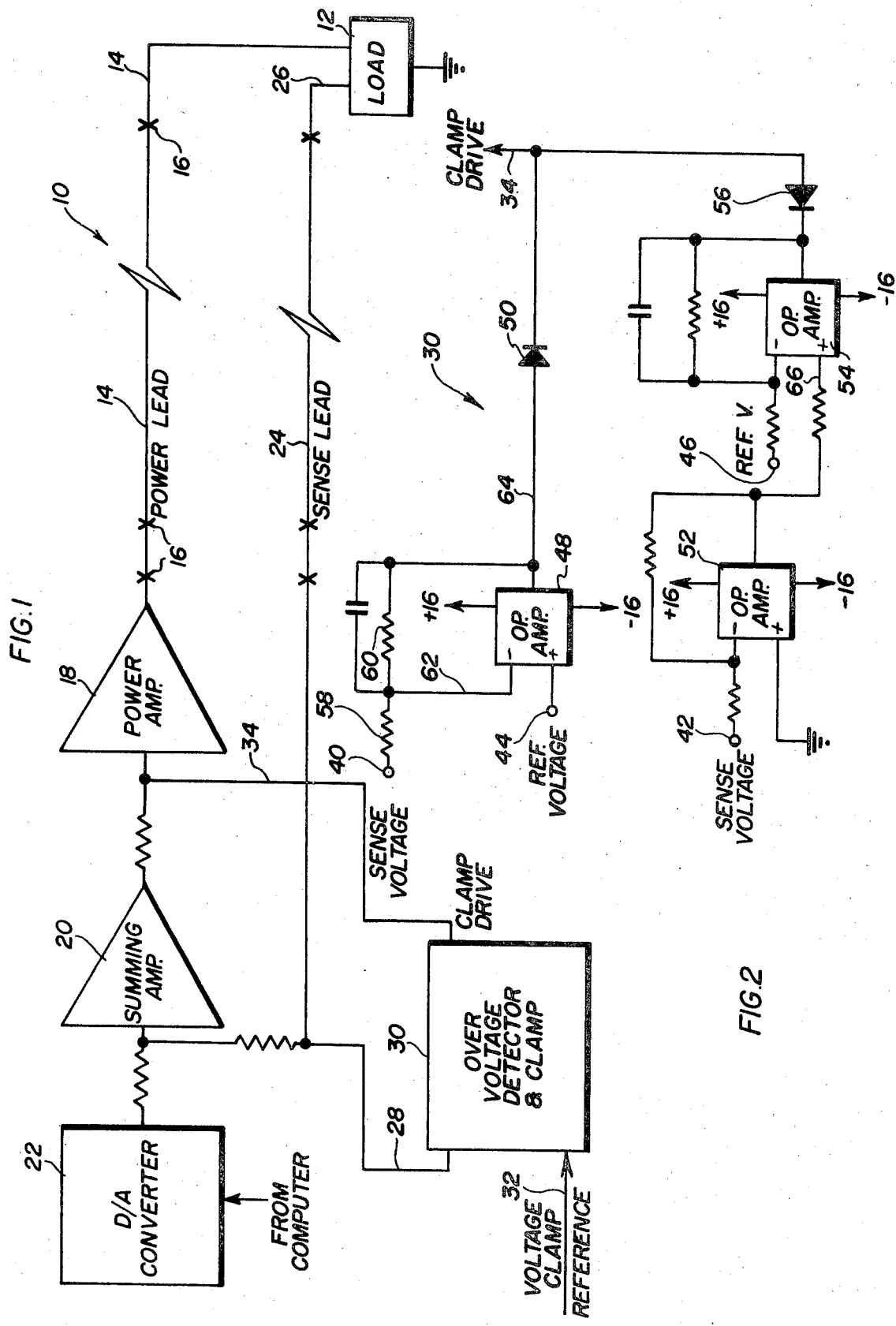

3,818,274

REMOTE SENSING VOLTAGE CLAMPING CIRCUIT

This invention relates to voltage sensing and clamping circuits and more particularly to apparatus for sensing the voltages supplied to loads which are at remote locations from the power source and to limit the supply voltage to prevent an overvoltage condition.

The following U.S. patents were disclosed in a preliminary novelty search and may be referred to generally to ascertain the prior art: Nos. 3,659,189; 3,577,064; 3,532,936; 3,470,457; 3,383,585; 3,163,814; 3,138,752 and 3,098,192.

In many systems, a load circuit is remotely situated with respect to its power source. The interconnection is made through cables, wires, etc. and possibly through various switches, relay contacts, etc. Load circuits presently consist of many semiconductor devices which are critically responsive to overvoltage conditions which could cause the destruction of many of these devices. Such overvoltage condition can of course be prevented by constantly monitoring the voltage at the remote location. However, this is not always practical, and it is more desirable to sense the voltage at the power source and thereby prevent an overvoltage condition through various means.

One example of such a prior art system utilizes a Zener diode at the output of the power source which will clamp the output of the power source before it exceeds a predetermined limit. However, due to the possibly large impedance loss in the interconnecting line and switches, relay contacts, etc. between the remote location and the power source, the actual voltage present at the load may be much below the level desired or required for proper operation or testing of the load circuit. It is therefore desirable to obtain a more accurate indication of the true voltage at a remote load so that any overvoltage conditions can be prevented at the power source and yet the proper desired voltage level will otherwise be supplied to the load. Such a system must of course be useful regardless of the impedance drop within the interconnecting apparatus, such as in the wires, cables, and any intermediate switching equipment such as possible high resistance relay contacts.

SUMMARY OF THE INVENTION

A remote sensing voltage clamping apparatus is provided for sensing the actual load voltage at a remote location and clamping the output of the power source at a value to prevent an overvoltage condition at the load. The apparatus includes a high impedance sense lead for sensing the actual load voltage at the remote location and presenting the sensed value to an overvoltage detector. If the voltage attempts to exceed the desired value at the load, such a condition is sensed by the overvoltage detector circuit to actuate a voltage clamping circuit so that the output of the power source is held at a value below the predetermined overvoltage load level at the remote location.

BRIEF DESCRIPTION OF THE DRAWINGS

FIG. 1 is a block diagram illustrating the apparatus of the present invention; and FIG. 2 is a schematic diagram of the overvoltage detector and voltage clamping circuits in the preferred embodiment of the present invention.

DETAILED DESCRIPTION

Referring now to FIG. 1, there is illustrated a system 10 in which a load 12 at a remote location is interconnected by power lead 14 through a series of relay or switching contacts 16 to a power source 18. As shown in FIG. 1, the present invention is illustrated for use in connection with apparatus such as summing amplifier 20 and a digital to analog converter 22 which controls the power amplifier 18 and therefore controls the voltage level supplied to remote load 12. It is to be understood of course that the present invention can be utilized by any type of system in which it is desired to sense the voltage at a remote load and to control the power source so as to prevent an overvoltage remote load condition. Therefore, the illustration herein shown in FIG. 1 with respect to digital to analog converter 22 and summing amplifier 20 is merely for purposes of illustrating a system in which the preferred embodiment of the present invention can be utilized.

Under normal operation, the converter 22 converts digital information input to an analog signal which when processed through summing amplifier 20 can vary the power amplifier 18 and thereby vary the voltage supplied to the remote load 12, as in prior art systems. However, due to the varying amount of impedance in power lead 12 and the unknown condition of any relay contacts 16, the value of the actual impedance drop from power amplifier 18 to the remote load 12 is not known without measurement and/or calculation.

In such a system, there has been provided a sense lead 24 having one end 26 connected through a suitable impedance to the load 12 so as to sense the voltage supplied thereto through power lead 14. Another end 28 of the sense lead is connected to the input of an overvoltage detector and clamp circuit 30. Due to the high impedance connection of the sense lead end 26 at the remote load 12, there is negligible current flowing in the sense lead so that any impedance losses are negligible. Thus, for any practical purpose, the voltage appearing at sense lead end 26 at the remote load 12 is the same as that which appears at the sense lead end 28 at the sensed input to the overvoltage detector and clamp 30.

Another input to the overvoltage detector and clamp 30 is supplied with a voltage clamp reference level at input 32. If the sensed load voltage attempts to exceed the value on the voltage clamp reference input 32, the overvoltage detector and clamp circuit 30 provides a clamping drive voltage through lead 34 to the power amplifier 18. The drive signal on lead 34 to the power amplifier 18 is such that the absolute value of the output of the power amplifier sensed on lead 26 at the remote load 12 is held substantially at a predetermined overvoltage level.

It is understood that under normal circumstances the summing amplifier 20 normally controls the voltage applied to the remote load through the power amplifier 18. However, if the digital to analog converter 22 is, for instance, under automatic computer control and attempts to exceed the predetermined maximum value allowed at the remote load 12, then the overvoltage detector and clamp circuit 30 takes over to limit the output of power amplifier 18 to insure that the overvoltage level at the remote load is not exceeded.

Various types of detector and clamping devices 30 can be utilized by those skilled in the art to operate in accordance with the present invention. Reference may be made to FIG. 2, wherein there is illustrated a preferred embodiment of the detector and clamp circuit 30.

In FIG. 2, the sensed voltage on sense lead 24 is presented to terminals 40 and 42. The clamp voltage reference input 32 is applied to terminals 44 and 46. Operational amplifier 48 is the negative overvoltage detector and its outlet is coupled through diode 50 to the clamp lead 34 which is attached to the input of power amplifier 18. Operational amplifier 52 inverts the sensed voltage and applies the same to operational amplifier 54.

Operational amplifier 54 is the positive overvoltage detector and its output through diode 56 provides the positive voltage clamp on clamp lead 34. In a constructed embodiment of the invention, a five to one voltage divider was utilized, so that the voltage sensed at the load 12 will be five times the value of the voltage which appears at the overvoltage detectors 48 and 54. If a ten volt clamp is desired, then two volts would be applied to the reference voltage inputs 44 and 46.

In normal operation, i.e., when an overvolatge condition does not exist, diodes 50 and 56 will be reverse biased. As an example, assume that the desired clamp voltage at load 12 will be set at 10 volts, so that the reference voltage applied to inputs 44 and 46 will be a negative 2 volts. Assuming that negative 5 volts is applied to the load 12 under test, the output of a conventional resister divider network and follower operational amplifier (not shown) will provide a negative 1 volt to the summing resistor 58. This circuit will thus have a gain determined by the ratio of resistor 58 to resistor 60. In one constructed embodiment of the invention a circuit gain of 56 was found to operate satisfactorily. With negative 2 volts applied to the non-inverting input 44 of operational amplifier 48 and negative one volt applied to the inverting input 62 through resistor 58, the output on line 64 will go more negative. Since the output of operational amplifier 48 could not reach a negative voltage that would balance the voltage on the non-inverting input and the summing point or inverting input, its output on line 64 will settle at its maximum output of between negative 12 to 13 volts. The voltage on the cathode side of diode 50 would be between plus and minus 5 volts. This leaves diode 50 reverse biased and no clamping action will occur.

Operational amplifier 54 operates in a similar manner for positive overvoltage operation. The main difference being that the reference voltage is applied to the inverting input and the sense voltage is inverted and applied to the non-inverting input 66.

To illustrate an overvoltage condition, it will be assumed that negative 15 volts appears at the load 12 under test and the voltage clamp reference is set at ten volts. The sensed 15 volts would divide down in the resistor network to negative three volts. Since the non-inverting input 44 of operational amplifier has negative two volts applied, the output on line 64 must go more positive to balance the signal applied to the inverting input through the summing resistor 58. The output on line 64 will go more positive and will attempt to reach positive 12 volts. This will forward bias diode 50 causing the diode to conduct, and through well known means will override the output of summing amplifier 20 so that the resultant voltage at the load 12 will approach negative 10 volts. The output of operational amplifier 54 operates in a similar manner for positive overvoltage operation. The main difference being that a positive overvoltage condition would cause the output of operational amplifier 54 to go more negative and allow diode 56 to conduct.

The foregoing detailed description has been given for clearness of understanding only, and no unnecessary limitations should be understood therefrom as modifications will be obvious to those skilled in the art.

What is claimed is:

1. In a system having a power source, a load circuit at a remote location from the power source, a power lead interconnecting said power source and said load circuit, improved means for preventing an overvoltage level at said load circuit, said improved means comprising:

a voltage sensing lead;

means for coupling one end of said sensing lead to said load circuit for sensing the load voltage level at said load circuit supplied from said power source;

an overvoltage detecting circuit adjacent said power source, including means for detecting a sensed voltage level greater than a reference voltage level;

means for coupling said reference voltage level to said overvoltage detecting circuit;

means for coupling the other end of said sensing lead to said overvoltage detecting circuit to provide said sensed voltage level proportionate to said load voltage level;

a voltage clamping circuit intermediate said overvoltage detector circuit and said power source, said voltage clamping circuit including means responsive to the detection of a sensed voltage level greater than said reference voltage level for clamping the output of said power source so as not to exceed said overvoltage level at the load circuit.

2. The improvement of claim 1, wherein said overvoltage detecting circuit includes positive and negative detecting means for detecting positive and negative overvoltage levels at said load circuit.

3. The improvement of claim 2, wherein said negative detecting means includes an operational amplifier having an inverting input and a non-inverting input; means for applying said sensed voltage level to said non-inverting input; and means for applying said reference voltage level to said inverting input.

4. The improvement of claim 3, wherein said positive detecting means includes an operational amplifier having an inverting input and a non-inverting input; means for inverting said sensed voltage level and applying the inverted level to said non-inverting input; and means for applying said reference voltage level to said inverting input.

5. The improvement of claim 4, wherein said voltage clamping circuit includes a diode; means for coupling said diode to the output of said operational amplifier associated with said negative detecting means; and means for forward biasing said diode in response to the detection of a sensed voltage level greater than said reference voltage level.

6. The improvement of claim 5, wherein said voltage clamping circuit further includes a second diode; means for coupling said second diode to the output of said operational amplifier associated with said positive detecting means; and means for forward biasing said second diode in response to the detection of a sensed voltage level greater than said reference voltage level.

7. Apparatus for sensing the load voltage level at a load circuit remotely located from an associated power source and preventing undesired overvoltage levels at said load, said apparatus comprising:
 a high impedance sensing lead having one end coupled to said load circuit at said remote location and the other end extending from said load circuit to the location of said power source, and including means for providing a sensing signal proportionate to said load voltage level;
 an overvoltage detecting and clamping circuit for detecting approaching positive and negative overvoltage levels at said load circuit and clamping said load voltage level so as not to exceed said overvoltage level; said overvoltage detecting and clamping circuit including;
 a first amplifier circuit having respective inverting and non-inverting inputs and an output;
 a second amplifier circuit having respective inverting and non-inverting inputs and an output;
 means for applying said sensing signal to the inverting input of said first amplifier circuit;
 inverting means for inverting said sensing signal;
 means for coupling said inverted sensing signal to the non-inverting input of said second amplifier circuit;
 reference voltage means including means for coupling a reference voltage level respectively to the non-inverting input of said first amplifier circuit and to the inverting input of said second amplifier circuit; and
 respective clamping means responsive to said sensing signal and said reference voltage level at said respective first and second amplifier circuits for providing a respective clamping signal to clamp said load voltage level substantially at said overvoltage level when said sensing signal approaches respective positive or negative overvoltage levels.

8. Apparatus according to claim 7, wherein said inverting means includes an inverting amplifier and means coupling said sensing signal to the input of said inverting amplifier.

* * * * *